(12) United States Patent
Kusaka

(10) Patent No.: US 7,926,609 B2
(45) Date of Patent: Apr. 19, 2011

(54) VEHICLE BODY STRUCTURE

(75) Inventor: Kaoru Kusaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 12/462,033

(22) Filed: Jul. 28, 2009

(65) Prior Publication Data

US 2010/0032983 A1 Feb. 11, 2010

(30) Foreign Application Priority Data

Aug. 6, 2008 (JP) ................................. 2008-203065

(51) Int. Cl.
*B62D 27/04* (2006.01)
*B62D 27/02* (2006.01)
*B62D 27/00* (2006.01)

(52) U.S. Cl. ........ 180/232; 180/271; 180/274; 180/282; 180/312; 280/784

(58) Field of Classification Search .................. 180/274, 180/271, 282, 312, 232; 280/784; *B62D 27/00, B62D 27/02, 27/04*
See application file for complete search history.

(56) References Cited

U.S. PATENT DOCUMENTS

| | | | | |
|---|---|---|---|---|
| 4,541,645 A | * | 9/1985 | Foeldesi .......................... | 180/68.4 |
| 5,992,555 A | * | 11/1999 | Sakamoto et al. .............. | 180/232 |
| 7,380,632 B2 | * | 6/2008 | Claar et al. ..................... | 180/274 |
| 2003/0209380 A1 | * | 11/2003 | Anzai et al. .................... | 180/312 |
| 2004/0046381 A1 | * | 3/2004 | Yoshida et al. ................ | 280/784 |
| 2004/0124621 A1 | * | 7/2004 | Knight-Newbury et al. .. | 280/748 |
| 2006/0033612 A1 | * | 2/2006 | Santa ............................. | 340/435 |
| 2006/0113784 A1 | | 6/2006 | Kishima | |
| 2010/0004826 A1 | * | 1/2010 | Ostling et al. .................. | 701/45 |

FOREIGN PATENT DOCUMENTS

| | | |
|---|---|---|
| JP | 11-192976 A | 7/1999 |
| JP | 2000-108946 | 4/2000 |
| JP | 2004-098799 | 4/2004 |
| JP | 2004-203274 A | 7/2004 |
| JP | 4026815 | 10/2007 |
| JP | 2008-055970 A | 3/2008 |

* cited by examiner

*Primary Examiner* — Paul N. Dickson
*Assistant Examiner* — Barry Gooden, Jr.
(74) *Attorney, Agent, or Firm* — Carrier Blackman & Associates, P.C.; William D. Blackman; Joseph P. Carrier

(57) ABSTRACT

Vehicle body structure includes: a sub frame mounted to a vehicle body frame via elastic members and having at least one of suspensions and a power source supported thereon; a collision detecting sensor; and load transmitting connection mechanisms for connecting the sub frame to the vehicle body frame once the collision detecting sensor detects a collision of the vehicle. Load transmission characteristic provided between the vehicle body frame and the sub frame by the load transmitting connection mechanism is greater than a load transmission characteristic provided by the elastic bushes.

4 Claims, 8 Drawing Sheets

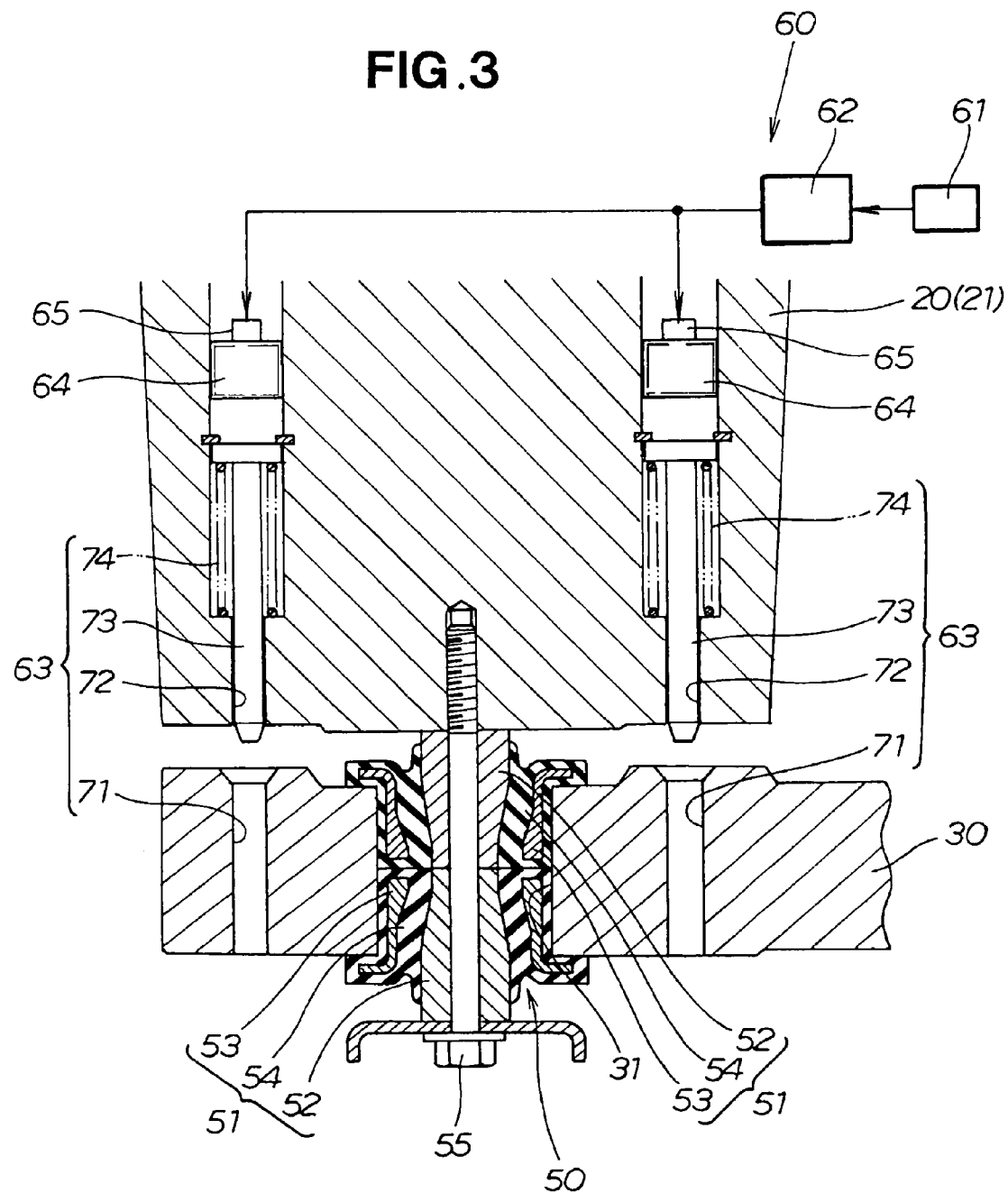

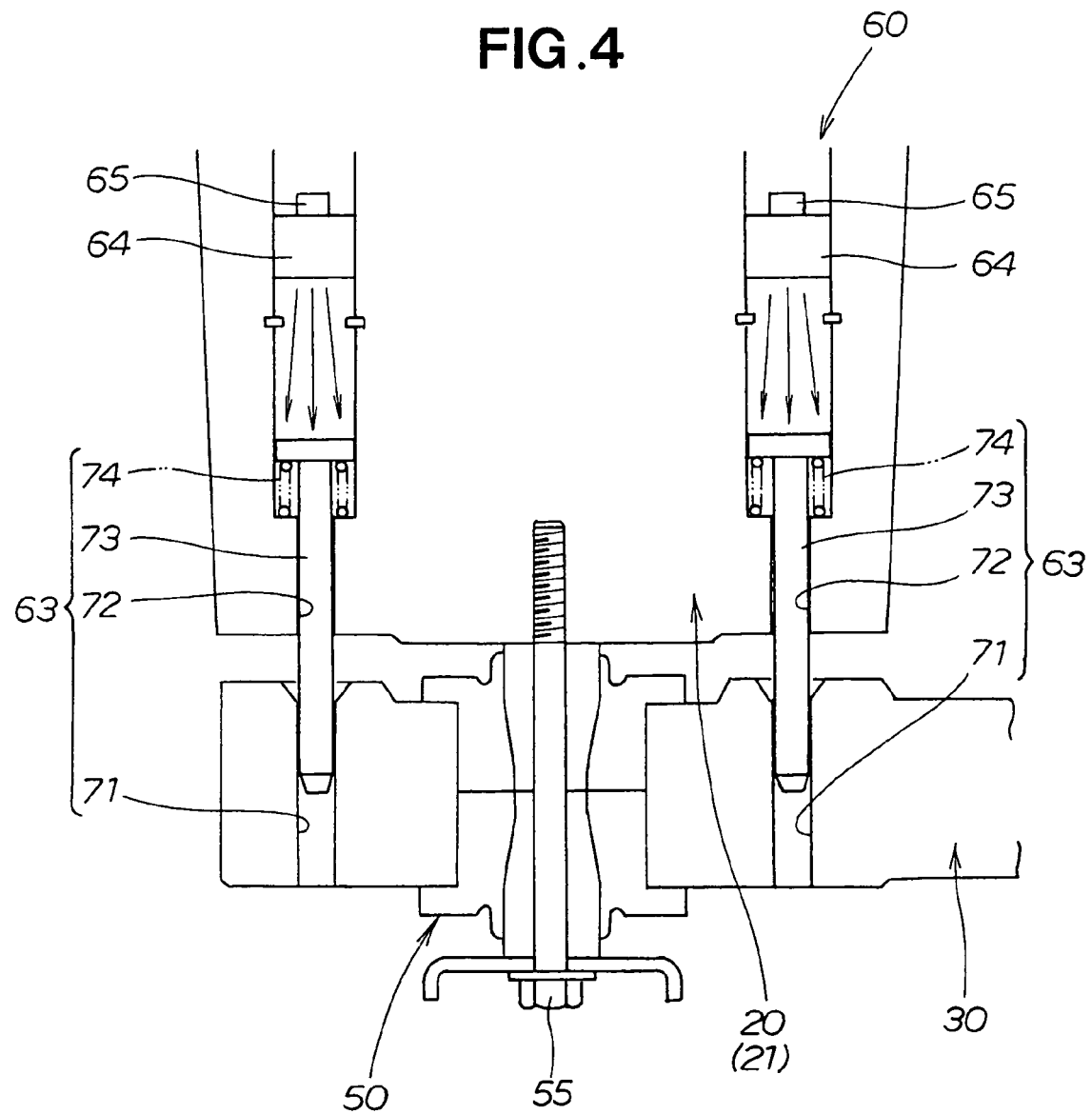

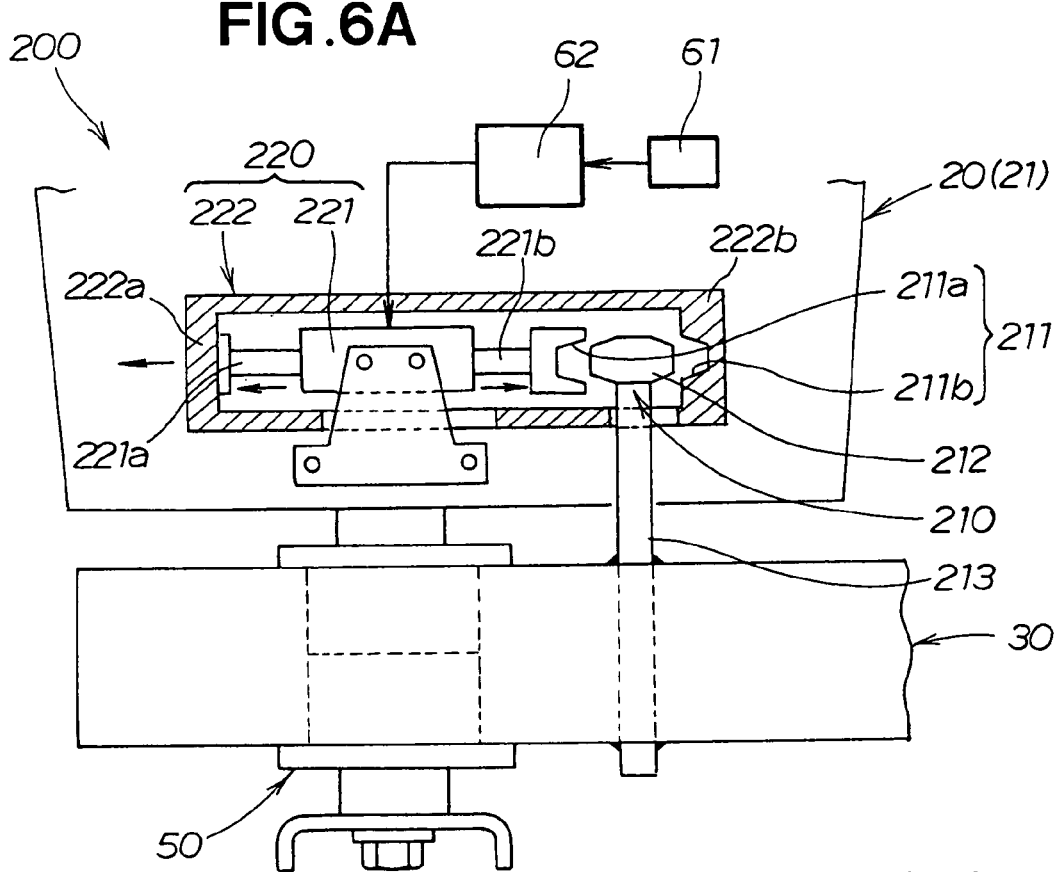
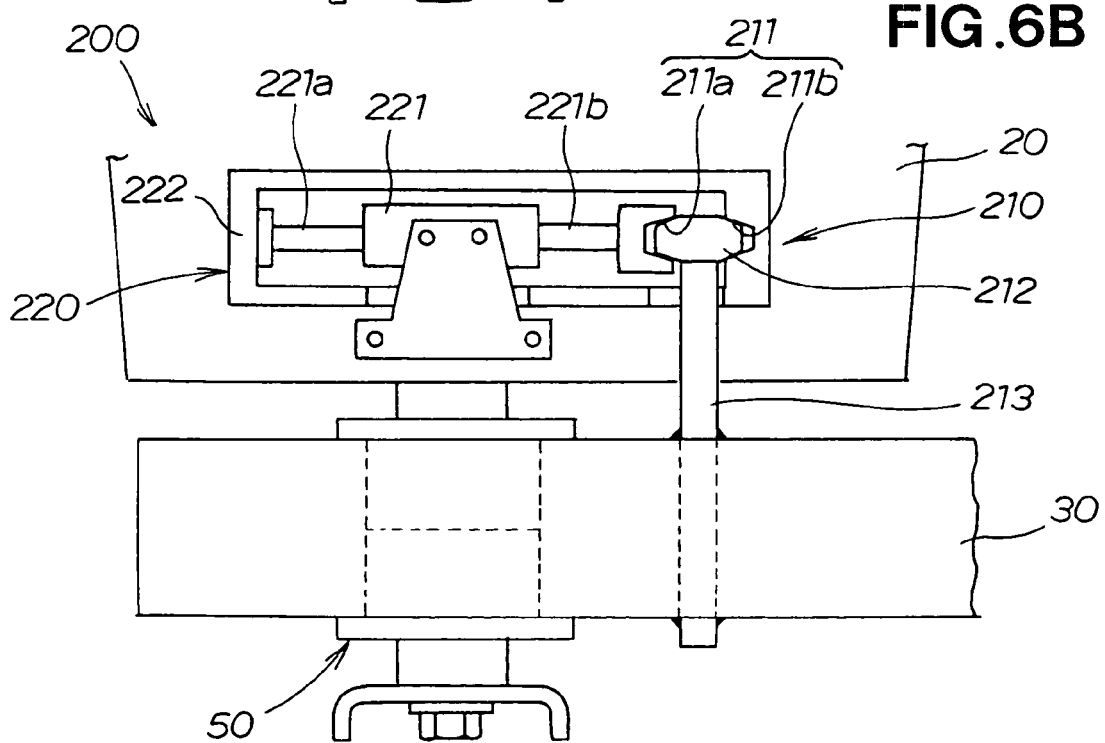

VEHICLE BODY STRUCTURE

FIELD OF THE INVENTION

The present invention relates to vehicle body structures where a sub frame is mounted to a vehicle body frame.

BACKGROUND OF THE INVENTION

Among various types of vehicles, such as automobiles, is one employing a vehicle body structure where a sub frame having suspensions and an engine supported thereon is mounted to a vehicle body frame. Examples of the structure for mounting the sub frame to the vehicle body frame include a fixing-type mounting structure and a floating-type mounting structure (floating support structure). The fixing-type mounting structure is a structure that mounts the sub frame directly to the vehicle body frame. Where the fixing-type mounting structure is employed, the sub frame can absorb collision energy together with the vehicle body frame when the collision energy has acted on the vehicle body from the front of the vehicle.

During travel of a vehicle, not only vibrations are transmitted from wheels (i.e., road wheels) to the sub frame via suspensions, but also vibrations are transmitted from an engine to the sub frame via an engine mount. With the fixing-type mounting structure, however, these vibrations would be transmitted from the sub frame to the vehicle body frame. Therefore, the fixing-type mounting structure is disadvantageous in that it can not effectively restrain vibrations and sound noise from being transmitted to the interior of a vehicle compartment to achieve an enhanced riding comfort and amenity of vehicle occupants.

The floating-type mounting structure is a structure for mounting the sub frame to the vehicle body frame via elastic members (anti-vibration rubber). Where the floating-type mounting structure is employed, vibrations transmitted from the road wheels to the sub frame via the suspensions and vibrations transmitted from the engine to the sub frame via the engine amount during travel of the vehicle can be lessened by the elastic members so that the vibrations are effectively prevented from being transmitted to the vehicle compartment. Therefore, the floating-type mounting structure is advantageous in that it can restrain vibrations and sound noise from being transmitted to the interior of the vehicle compartment to achieve an enhanced riding comfort and amenity of vehicle occupants. However, because the elastic members are interposed between the vehicle body frame and the sub frame, the elastic members would be deformed when collision energy has acted on the vehicle body from the front of the vehicle. Thus, some measures have to be taken for efficiently absorbing the collision energy by means of the sub frame. In such a case, it is necessary not only to avoid the structure from becoming complicated but also to minimize increase of the weight of the vehicle; increase of the weight of the vehicle would become a cause of lowering the mileage (i.e., a distance which the vehicle can travel per unit quantity of fuel).

In recent years, development of an improved floating-type mounting structure with collision energy into consideration is under way. The improved floating-type mounting structure is constructed in such a manner that, when collision energy more than a predetermined level has acted on the vehicle body frame, some of a plurality of bolts connecting the sub frame to the vehicle body frame are broken to cause the sub frame to fall from the vehicle body frame so as to lessen an impact on the vehicle compartment. One example of such an improved floating-type mounting structure is disclosed in Japanese Patent Publication No. 4026815. With the improved floating-type mounting structure too, it is more preferable that collision energy be effectively absorbed by the sub frame.

As apparent from the foregoing, the vehicle body structures are requested to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame and sub frame.

SUMMARY OF THE INVENTION

In view of the foregoing prior art problems, it is an object of the present invention to provide an improved vehicle body structure which can achieve an enhanced riding comfort and amenity of a vehicle occupant during normal travel of the vehicle but also achieve an enhanced vehicle occupant protecting performance when collision energy has acted on the vehicle body.

In order to accomplish the above-mentioned object, the present invention provides an improved vehicle body structure, which comprises: a vehicle body frame; a sub frame mounted to the vehicle body frame via an elastic member and having at least one of a suspension and a power source supported thereon; a collision detecting sensor; and a load transmitting connection mechanism for connecting the sub frame to the vehicle body frame once the collision detecting sensor detects a collision of the vehicle. Load transmission characteristic provided between the vehicle body frame and the sub frame by the load transmitting connection mechanism is greater than a load transmission characteristic provided by the elastic bush.

In the vehicle body structure of the present invention, the sub frame having at least one of the suspension and the power source supported thereon is mounted to the vehicle body frame via a resilient member, namely, via the so-called floating mounting structure. Thus, vibrations transmitted from a road wheels to the sub frame via the suspension and vibrations transmitted from an engine to the sub frame via an engine amount during travel of the vehicle are lessened by the elastic member so that the vibrations are effectively prevented from being transmitted to the vehicle compartment. Therefore, the floating-type mounting structure can advantageously restrain vibrations and sound noise from being transmitted to the interior of the vehicle compartment to achieve an enhanced riding comfort and amenity of vehicle occupants.

Further, with the vehicle body structure of the present invention, which includes the collision detecting sensor and the load transmitting connection mechanism, the load transmitting connection mechanism connects the sub frame to the vehicle body frame once the collision detecting sensor detects a collision of the vehicle. Furthermore, because the load transmission characteristic provided between the vehicle body frame and the sub frame by the load transmitting connection mechanism is greater than the load transmission characteristic provided by the elastic bush, the sub frame can be firmly connected to the vehicle body frame, so that collision energy can be absorbed by the sub frame efficiently. Namely, when collision energy has been applied to the vehicle body, the sub frame can be used (i.e., can function) as an efficient collision energy absorbing member. As a result, it is possible to enhance the vehicle occupant protecting function when collision energy has acted on the vehicle body.

Further, because the vehicle body structure of the present invention comprises the simple construction including the collision detecting sensor and load transmitting connection mechanism and because the sub frame can be used (i.e., can function) as an efficient collision energy absorbing member, the present invention can eliminate a need for a separate member for absorbing energy, which can minimize the overall weight of the vehicle. Such minimization of the overall weight of the vehicle can be extremely advantageous in increasing the mileage of the vehicle.

With such arrangements, the present invention can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame and sub frame.

In an embodiment, the load transmitting connection mechanism has a hole provided in one of the vehicle body frame and the sub frame and a pin provided on the other of the vehicle body frame and the sub frame, and the pin is caused to fit into the hole once the collision detecting sensor detects a collision of the vehicle. Thus, the present invention can even further simplify the construction of the load transmitting connection mechanism. Further, because the pin is caused to fit into the hole, the sub frame can be connected to the vehicle body frame even more firmly and reliably at the time of a collision of the vehicle.

In another embodiment, the load transmitting connection mechanism has a fitting recessed portion provided in one of the vehicle body frame and the sub frame and a fitting projecting portion provided on the other of the vehicle body frame and the sub frame, and the fitting projecting portion is caused to fit into the fitting recessed portion once the collision detecting sensor detects a collision of the vehicle. Thus, the present invention can even further simplify the construction of the load transmitting connection mechanism. Further, because the fitting projecting portion is caused to fit into the fitting recessed portion, the sub frame can be connected to the vehicle body frame even more firmly and reliably at the time of a collision of the vehicle.

Preferably, the collision detecting sensor comprises an acceleration sensor. With the collision detecting sensor comprising an acceleration sensor, it is possible to readily set an acceleration reference value with which to detect a collision of the vehicle. As a result, it is possible to clearly set a reference with which to activate the load transmitting connection mechanism.

According to a second aspect of the present invention, there is provided an improved vehicle body structure, which comprises: a vehicle body frame; and a sub frame mounted to the vehicle body frame via an elastic member and having at least one of a suspension and a power source supported thereon. One of the vehicle body frame and the sub frame has a fitting recessed portion while the other of the vehicle body frame and the sub frame has a fitting projecting portion, and the fitting projecting portion is caused to fit into the fitting recessed portion at the time of a collision of the vehicle. Further, the fitting recessed portion and the fitting projecting portion are aligned with each other in a front-rear direction of the vehicle body with a predetermined gap formed in the front-rear direction of the vehicle body between the bottom of the fitting recessed portion and the distal end of the fitting projecting portion.

In the vehicle body structure according to the second aspect of the present invention, the sub frame having at least one of the suspension and the power source supported thereon is mounted to the vehicle body frame via a resilient member, namely, via the so-called floating mounting structure. Thus, vibrations transmitted from the road wheel to the sub frame via the suspension and vibrations transmitted from an engine to the sub frame via the engine amount during travel of the vehicle are lessened by the elastic member so that the vibrations are effectively prevented from being transmitted to the vehicle compartment. Therefore, the floating-type mounting structure of the invention can advantageously restrain vibrations and sound noise from being transmitted to the interior of the vehicle compartment to achieve an enhanced riding comfort and amenity of vehicle occupants.

Further, in the aforementioned vehicle body structure of the present invention, as the vehicle body frame and the sub frame are displaced relative to each other in the front-rear direction of the vehicle body due to collision energy applied to the vehicle body, the fitting recessed portion and the fitting projecting portion are displaced relative to each other in the front-rear direction into fitting engagement with each other, so that the sub frame is connected to the vehicle body frame. Consequently, the sub frame can be firmly connected to the vehicle body frame, so that collision energy can be absorbed by the sub frame efficiently. Namely, when collision energy has been applied to the vehicle body, the sub frame can be used (i.e., can function) as an efficient collision energy absorbing member. As a result, it is possible to enhance the vehicle occupant protecting function when collision energy has acted on the vehicle body.

Further, because the vehicle body structure of the present invention comprises the simple construction including the fitting recessed portion and the fitting projecting portion and, when collision energy has been applied to the vehicle body, it performs a passive action where the fitting projecting portion fits into the fitting recessed portion so that the sub frame can be used as an efficient collision energy absorbing member, the present invention can eliminate a need for a separate member for absorbing energy, which can minimize the overall weight of the vehicle. Such minimization of the overall weight of the vehicle can be extremely advantageous in increasing the mileage of the vehicle.

With such arrangements, the vehicle body structure according to the second aspect of the present invention can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame and sub frame.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 3 is a sectional view of one of anti-vibration elastic bushes and a first embodiment of a collision-responsive frame locking device shown in FIG. 2 and components provided around the anti-vibration elastic bush and collision-responsive frame locking device;

FIG. 4 is a view explanatory of behavior of the first embodiment of the collision-responsive frame locking device shown in FIG. 3;

FIGS. 6A and 6B are views explanatory of a construction and behavior of a third embodiment of the collision-responsive frame locking device;

DETAILED DESCRIPTION OF THE PREFERRED EMBODIMENTS

In the following description, the terms "front", "rear", "left", "right", "upper", "lower", etc. are used to refer to directions as viewed from a human operator or driver of a vehicle.

Figure 1:
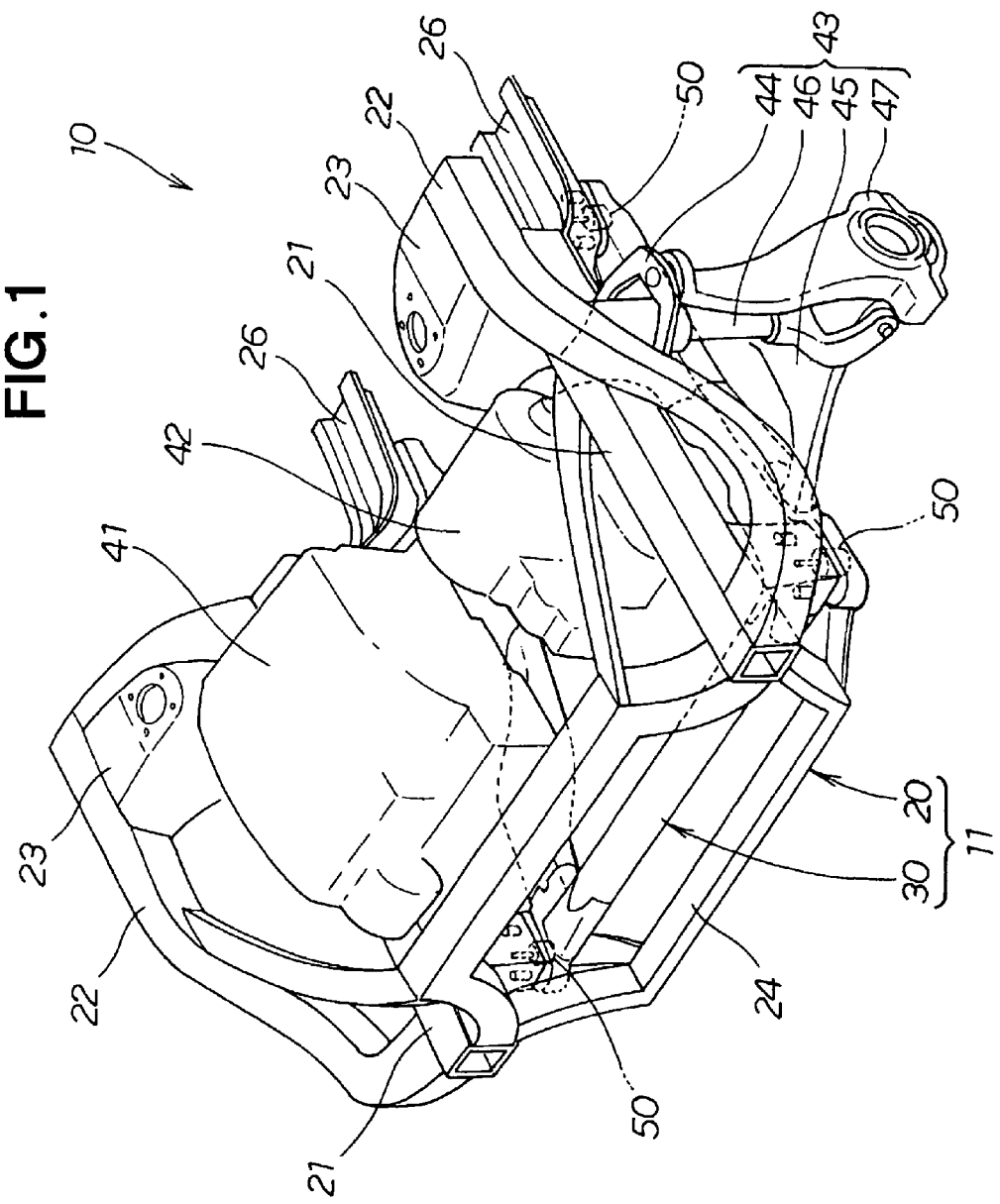
FIG. 1 is a perspective view of a front section of a vehicle to which the present invention is applied.
Figure 2:
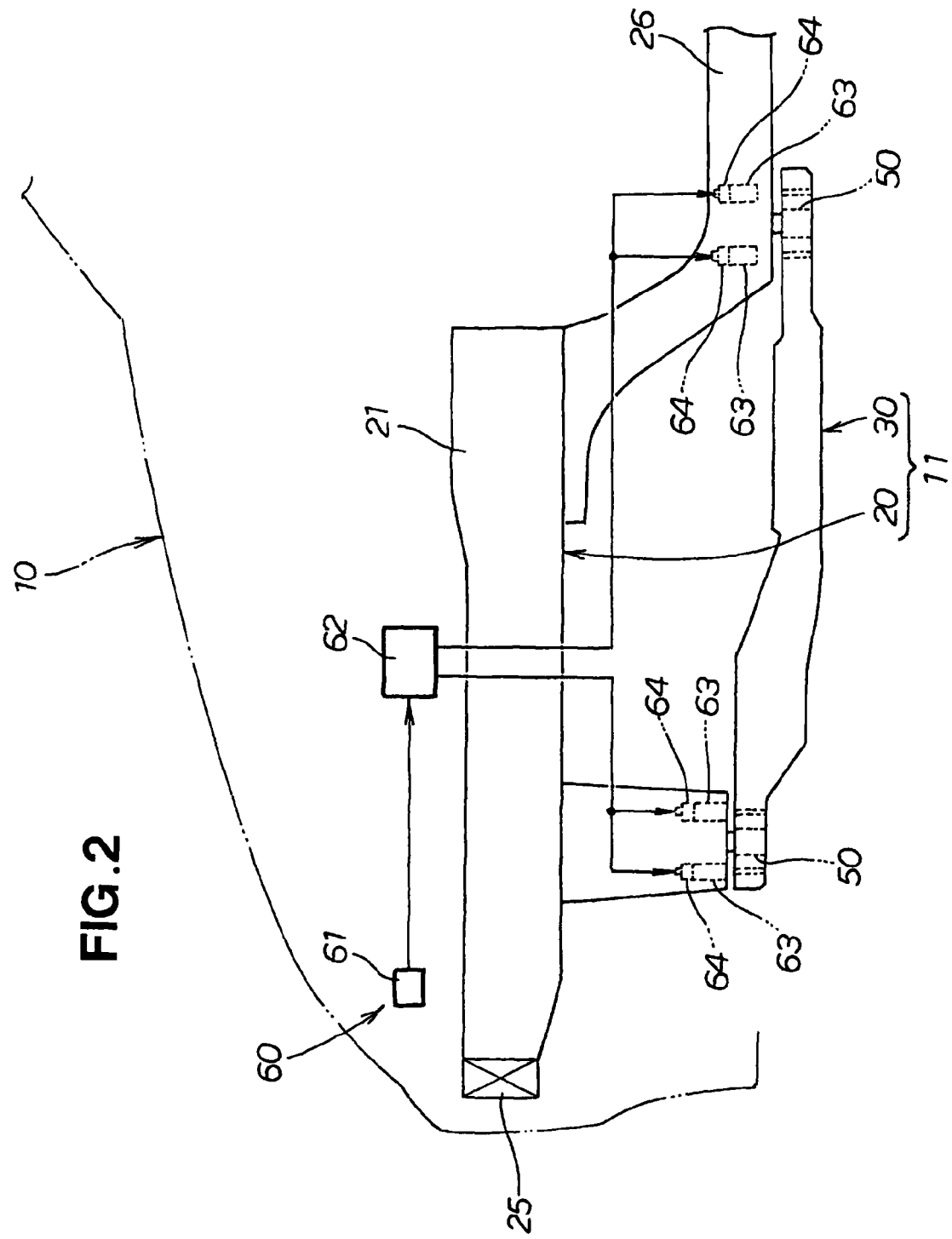
FIG. 2 is a left side view of the front section of the vehicle shown in FIG. 1.

First, with reference to FIGS. 1 and 2, a description will be given about the outline of the vehicle to which the present invention is applied. FIG. 1 is a perspective view of a front section of the vehicle to which the present invention is applied, and FIG. 2 is a left side view of the front section of the vehicle shown in FIG. 1.

Front section of a vehicle body 11 of the vehicle 10 includes a vehicle body frame 20 and a sub frame 30 mounted to a front section of the vehicle body frame 20.

The front section of the vehicle body frame 20 is constructed as a monocoque body which includes, as its main components, left and right front side frames 21 extending in a front-rear direction of the vehicle body on left and right sides of the vehicle body; left and right upper frames 22 located outwardly (as viewed in a width direction of the vehicle) and upwardly of the left and right front side frames 21 and extending in the front-rear direction of the vehicle body; left and right damper housings 23 spanning between the left front side frame 21 and the left upper frame 22 and between the right front side frame 21 and the right upper frame 22, respectively; a front bulkhead connected to respective front end portions of the left and right front side frames 21 and left and right upper frames 22; and a bumper 25 spanning between the front ends of the left and right front side frames 21.

In the vehicle body frame 20, the sub frame 30 are mounted to and hung from front end portions of the left and right front side frames 21 and left and right floor frames 26, extending rearwardly from respective rear ends of the left and right front side frames 21, via four anti-vibration elastic bushes (only three of which are shown in FIG. 1) 50.

The sub frame 30 is a frame having a substantially square shape as viewed in plan, and an engine (power source) 41 is transversely mounted on a right half section of the sub frame 30, a transmission 42 is mounted on a left half section of the sub frame 30, and left and right suspensions (right suspension is not shown) 43 are mounted on left and right sides of the sub frame 30.

The left suspension 43 is a front wheel suspension device which suspends the front wheel (not shown) on the vehicle body frame 20, and which includes, as its main components, an upper arm 44 vertically pivotably mounted to the left front side frame 21, a lower arm 45 pivotably mounted to a left side portion of the sub frame 30, a cushion 46 provided between the lower arm 45 and the left damper housing 23 and a knuckle 47 connected to the upper arm 44 and lower arm 45. Because the left and right suspensions 43 are constructed in the same manner, description of the right suspension 43 is omitted.

With reference to FIG. 3, the following describe a construction of the anti-vibration elastic bushes 50 that mount four corner portions of the sub frame 30 to the underside of the vehicle body frame 20. FIG. 3 is a sectional view of one of the anti-vibration elastic bushes 50 of FIG. 2, a first embodiment of a collision-responsive frame locking device and components provided around the anti-vibration elastic bush 50 and collision-responsive frame locking device. Although the anti-vibration elastic bush (hereinafter referred to simply as "elastic bush") 50 may be constructed in the same manner as the conventionally-known counterparts that mount a sub frame to a vehicle body frame, the following describe an example construction of the anti-vibration elastic bush 50 employed in the present invention.

Namely, the elastic bush 50 comprises vertically-divided upper and lower elastic bush members 51. Each of the elastic bush members 51 is an anti-vibration member including an inner cylinder 52 and an outer cylinder 53 interconnected via an elastic element 54 formed of rubber (anti-vibration rubber). The vertically-divided upper and lower elastic bush members 51 are fixed to the front side frame 21 by being first fitted in a through-hole 31 of the sub frame 30 and fastened to the sub frame 30 by means of a mounting bolt 55 inserted through the inner cylinders 52 of the upper and lower elastic bush members 51. Thus, the sub frame 30 is mounted to the underside of the front side frames 21 by means of the elastic bushes 50. Namely, the structure for mounting the sub frame 30 to the vehicle body frame 20 in the present invention is a so-called floating-type mounting structure where the sub frame 30 is mounted to the vehicle body frame 20 via the elastic bushes 50. The elastic bushes 50 will hereinafter be sometimes referred to as "elastic members 50".

As shown in FIGS. 2 and 3, the vehicle 10 includes the collision-responsive frame locking device 60. The first embodiment of the collision-responsive frame locking device 60 includes a collision detecting sensor 61, a control section 62, a plurality of load transmitting connection mechanisms 63, and a plurality of connection drive sections 64.

The collision detecting sensor 61 that detects a collision of the vehicle 10 is provided on the front section of the vehicle body frame 20. The collision detecting sensor 61 comprises, for example, an acceleration sensor, which issues a detection signal once the detected acceleration exceeds a predetermined reference acceleration level (i.e., when the vehicle 10 has collided against some external obstacle). With the collision detecting sensor 61 comprising an acceleration sensor, it is possible to readily set an acceleration reference value with which to detect a collision of the vehicle 10. As a result, it is possible to clearly set a reference with which to activate the load transmitting connection mechanism 63.

The control section 62 controls the load transmitting connection mechanisms 63 upon receipt of the detection signal from the collision detecting sensor 61.

The plurality of load transmitting connection mechanisms 63 are activated once the collision detecting sensor 61 detects a collision of the vehicle 10, i.e. once a control signal is received from the control section 62, to allow the sub frame 30 to be connected to the vehicle body frame 20. Specifically, a total of eight load transmitting connection mechanisms 63 are provided, two load transmitting connection mechanisms 63 near each of the four elastic bushes 50; more specifically, the two load transmitting connection mechanisms 63 are disposed in front of and behind the corresponding elastic bush 50, practically sandwiching the elastic bush 50 in the front-rear direction.

Each of the load transmitting connection mechanisms 63 has a hole 71, a cylinder 72 and a pin 73. The hole 71 is a pin fitting through-hole that opens upwardly and downwardly and is formed in one of the vehicle body frame 20 and the sub frame 30. The pin fitting through-hole 71 has a pin fitting groove and recess. The cylinder 72 and the pin 73 are provided on the other of the vehicle body frame 20 and the sub frame 30. The cylinder 72 is disposed coaxially with the hole 71 and opens to face the hole 71. The pin 73 is a locking pin vertically slidably fitted in the cylinder 72, and it is fittable in the hole 71. The pin 73 is normally urged by a compression spring 74 in a direction away from the hole 71.

A total of eight connection drive sections 64 are provided, one for each of the load transmitting connection mechanisms 63 i.e., in one-to-one corresponding relation to the load transmitting connection mechanisms 63). These connection drive sections 64 drive the corresponding load transmitting connection mechanisms 63 independently of one another in response to a control signal given from the control section 62. More specifically, each of the connection drive sections 64 comprises, for example, an inflator, which drives the corresponding pin 73 to fit into the hole 71 in an extremely short time in response to the control signal given from the control section 62. The connection drive sections 64 will hereinafter be sometimes referred to as "inflators".

Next, a description will be given about behavior of the first embodiment of the collision-responsive frame locking device of FIG. 3, with primary reference to FIG. 4.

As shown in FIG. 1, the vehicle body 11 employs the so-called floating-type mounting structure where the sub frame 30 having at least one of the suspensions 43 and engine (power source) 41 supported thereon is mounted to the vehicle body frame 20 via the elastic bushes (elastic members) 50. Thus, during travel of the vehicle 10, vibrations transmitted from the wheels to the sub frame 30 via the suspensions 43 and vibrations transmitted from the engine 41 to the sub frame 30 via the elastic members 50 can be lessened by the elastic members 50, so that the vibrations are effectively prevented from being transmitted to the vehicle compartment. Consequently, it is possible to effectively restrain vibrations and sound noise from being transmitted to the vehicle compartment to achieve an enhanced riding comfort and amenity of vehicle occupants.

Then, once the collision detecting sensor 61 detects a collision of the vehicle 10 (see FIG. 2), the control section 62 issues an electric control signal to an ignition device 65 of each of the inflators 64. Upon receipt of the control signal, the ignition device 65 ignites a gas-generating agent to generate a large amount of gas and feeds the generated gas into the cylinder 72. With the thus-fed gas, pressure within the cylinder increases temporarily. As a consequence, the pin 73 slides downwardly toward the hole 71 and then is brought to fitting engagement with the hole 71 as shown in FIG. 4. In this way, each of the load transmitting connection mechanisms 63 connects the sub frame 30 to the vehicle body frame 20.

In the instant embodiment, the fitting engagement between the hole 71 and the pin 73 achieves an extremely firm connection between the vehicle body frame 20 and the sub frame 30, so that a great load can be transmitted, via the pin 73, in the front-rear direction between the vehicle body frame 20 and the sub frame 30. Namely, each of the load transmitting connection mechanisms 63 can achieve a great load transmission characteristic. Thus, the load transmission characteristic provided between the vehicle body frame 20 and the sub frame 30 by the load transmitting connection mechanisms 63 is greater than that provided by the elastic bushes 50. In this way, the sub frame 30 can be firmly connected to the vehicle body frame 20, and thus, collision energy can be efficiently absorbed by the sub frame 30. Namely, when collision energy has been applied to the vehicle body 11 (see FIG. 2), the sub frame 30 can be used (i.e., can function) as an efficient collision energy absorbing member. As a result, it is possible to even further enhance the vehicle occupant protecting function when collision energy has acted on the vehicle body 11.

Further, because the collision-responsive frame locking device 60 comprises the simple construction including only the collision detecting sensor 61, control section 62, load transmitting connection mechanisms 63 and connection drive sections 64 and because the sub frame 30 can be used (i.e., can function) as an efficient collision energy absorbing member, the instant embodiment can eliminate a need for a separate member for absorbing energy, which can minimize the overall weight of the vehicle 11. Such minimization of the overall weight of the vehicle 11 is extremely advantageous in that it can increase the mileage of the vehicle 10.

Further, because each of the load transmitting connection mechanisms 63 comprises a combination of the hole 71 and the pin 73 and because the pin 73 is caused to fit into the hole 71 once the collision detecting sensor 61 detects a collision of the vehicle, the instant embodiment can even further simplify the construction of the load transmitting connection mechanisms 63. Further, by the pin 73 fitting into the hole 71, the sub frame 30 can be connected to the vehicle body frame 10 even more firmly and reliably at the time of a collision.

In the aforementioned manner, the collision-responsive frame locking device 60 can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame 20 and sub frame 30.

Note that, in the first embodiment, the connection drive sections 64 may be implemented by electric actuators or the like rather than inflators. Further, in the first embodiment, the pin 73 may be fitted in the hole 71 either (1) in a loose fitting state where the pin 73 is fitted in the hole 71 with a loose fitting tolerance, i.e. with a slight gap, so as to permit reliable fitting even where there is some misalignment between the pin 73 and the hole 71, or (2) in a tight fitting state where the pin 73 is lightly press-fit in the hole 71, so as to permit a strict connection, to the vehicle body frame 20, of the sub frame 30.

Further, in the first embodiment, whether the hole 71 and pin 73 should be provided in the vehicle body frame 20 or in the sub frame 30 may be set as desired or as necessary, e.g. in accordance with the type of the vehicle and in such a manner that the sub frame 30 can be reliably connected to the vehicle body frame 20 or in such a manner that manufacture and assembly of the collision-responsive frame locking device 60 etc. can be facilitated.

Furthermore, in the first embodiment, the load transmitting connection mechanism 63 may comprise other than a combination of the hole 71 and the pin 73, such as a combination of complementary hook-shaped members.

The following describe a second embodiment of the collision-responsive frame locking device 100. Similar elements to those in the first embodiment of the collision-responsive frame locking device 60 are indicated by the same reference numerals as in the first embodiment and will not be described to avoid unnecessary duplication.

Figure 5A:
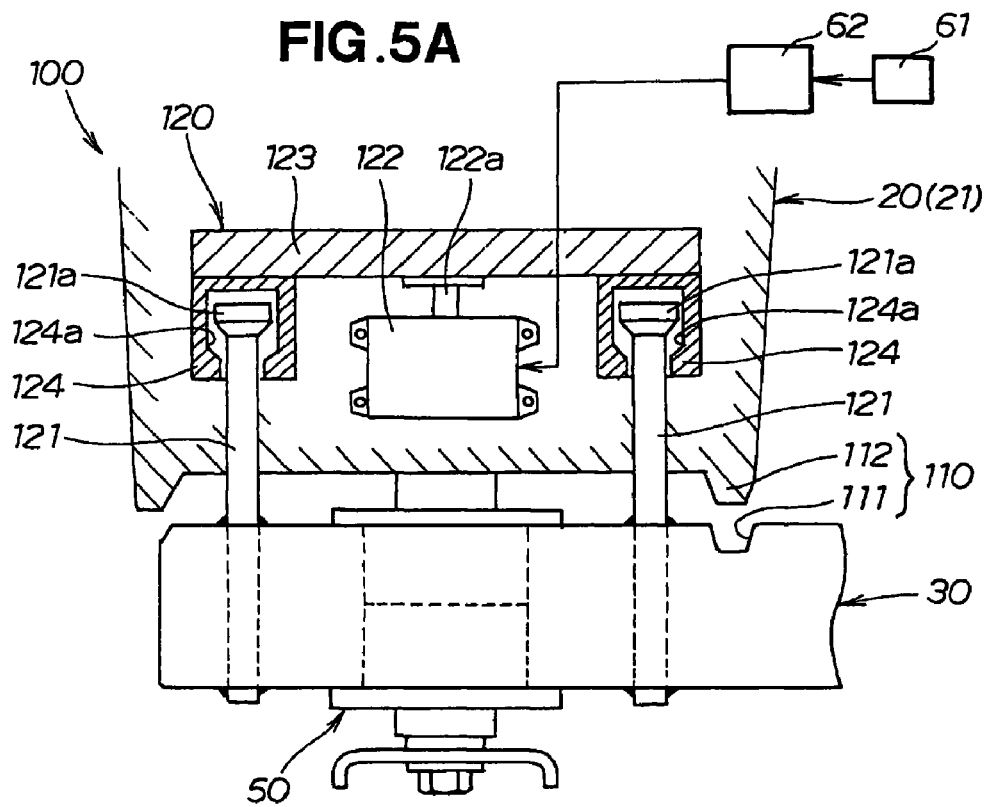
FIGS. 5A and 5B are views explanatory of a construction and behavior of a second embodiment of the collision-responsive frame locking device.
Figure 5B:
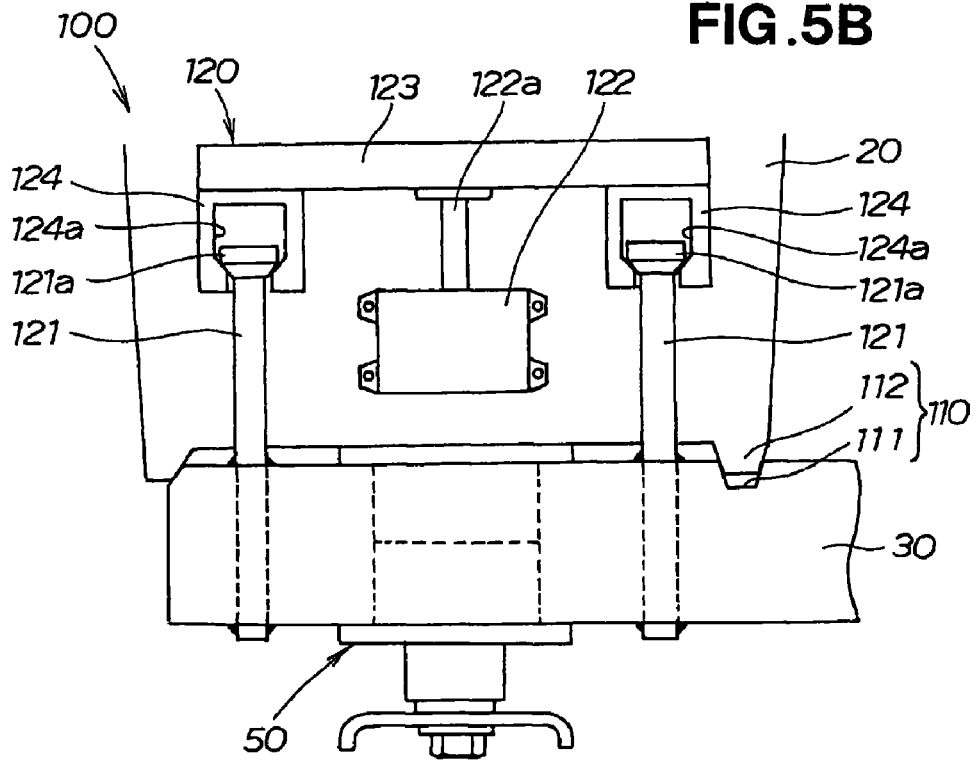

FIGS. 5A and 5B are views explanatory of a construction and behavior of the second embodiment of the collision-responsive frame locking device 100. FIG. 5A, which generally corresponds to FIG. 3, shows the construction of the second embodiment of the collision-responsive frame locking device 100, while FIG. 5B shows the behavior of the second embodiment of the collision-responsive frame locking device 100; note that in FIGS. 5A and 5B, the elastic bush 50 is shown in a non-sectional view.

As shown in FIG. 5A, the second embodiment of the collision-responsive frame locking device 100 includes the collision detecting sensor 61, the control section 62, a plurality of load transmitting connection mechanisms 110, and a plurality of connection drive sections 120.

Once the collision detecting sensor 61 detects a collision of the vehicle 10, i.e. once a control signal is received from the control section 62, each of the load transmitting connection mechanisms 110 is activated to connect the sub frame 30 to the vehicle body frame 20. A total of four load transmitting connection mechanisms 110 are provided, one load transmitting connection mechanisms 110 near each of the four elastic bushes 50.

Each of the load transmitting connection mechanisms 110 includes a fitting recessed portion 111 provided in one of the vehicle body frame 20 and sub frame 30 (sub frame 30 in the illustrated example), and a fitting projecting portion 112 provided on the other of the vehicle body frame 20 and sub frame 30 (vehicle body frame 20 in the illustrated example). The fitting projecting portion 112 and fitting projecting portion 112 are formed to be opposed to each other in a vertical direction.

A total of four connection drive sections 120 are provided, one four connection drive section 120 for each of the load transmitting connection mechanisms 110. These connection drive sections 120 drive the respective load transmitting connection mechanisms 110 independently of one another in response to a control signal given from the control section 62. Each of the connection drive sections 120 includes two rods 121, a drive source 122, a lifting plate 123 and two rod lifting portions 124.

The two rods 121 are each in the form of an elongated member extending upward from the sub frame 30 toward the vehicle body frame 20, and the two rods 121 are disposed near and in front of and behind the corresponding elastic bush 50 (i.e., with the corresponding elastic bush 50 in between). Each of the rods 121 has a horizontally bulging flange portion 121*a* formed integrally with the distal or upper end thereof; the flange portion 121*a* is greater in diameter than the remaining portion of the rod 121.

The drive source 122 is, for example, in the form of an electric actuator having an output rod 122*a* that, in response to a control signal from the control section 62, is stretched or expanded upward (i.e., away from the sub frame 30) in an extremely short time. The drive source 122 will hereinafter be sometimes referred to as "electric actuator 122".

The lifting plate 123 is vertically slidably mounted to the vehicle body frame 20 and connected to the output rod 122*a* of the electric actuator 122. Thus, the lifting plate 123 is raised or lifted by the electric actuator 122.

The two rod lifting portions 124 are each provided on the lifting plate 123 at a position vertically opposed to the corresponding flange portion 121*a*, and the two rod lifting portions 124 each have a lifting recessed portion 124*a*. Note that the rod lifting portions 124 may be formed integrally with the lifting plate 123. Normally, each of the rod lifting portions 124 loosely fits with the corresponding flange portion 121*a* so that the elastic bush 50 is not prevented from absorbing vibrations.

The second embodiment of the collision-responsive frame locking device 100 constructed in the above-described manner behaves as follows. Once the collision detecting sensor 61 detects a collision of the vehicle 10 (see FIG. 2), the electric actuator 122 of FIG. 5A, in response to an electric control signal from the control section 62, is caused to expand the output rod 122*a* upwardly so as to rapidly lift the lifting plate 123 and rod lifting portions 124. Consequently, each of the rod lifting portions 124 lifts the corresponding flange portion 121*a*, as shown in FIG. 5B. Thus, the sub frame 30 moves upwardly toward the vehicle body frame 20 so that the fitting projecting portion 112 fits into the fitting recessed portion 111. In this way, each of the load transmitting connection mechanisms 110 connects the sub frame 30 to the vehicle body frame 20.

In the second embodiment, the fitting engagement between the fitting recessed portion 111 and the fitting projecting portion 112 achieves an extremely firm connection between the vehicle body frame 20 and the sub frame 30, so that a great load can be transmitted, via the fitting recessed portion 111 and the fitting projecting portion 112, in the front-rear direction between the vehicle body frame 20 and the sub frame 30. Namely, each of the load transmitting connection mechanisms 110 can achieve a great load transmission characteristic. Thus, the load transmission characteristic provided between the vehicle body frame 20 and the sub frame 30 by the load transmitting connection mechanisms 110 is greater than that provided by the elastic bushes 50. In this way, the sub frame 30 can be firmly connected to the vehicle body frame 20, and thus, collision energy can be efficiently absorbed by the sub frame 30. Namely, when collision energy has been applied to the vehicle body 11, the sub frame 30 can be used (i.e., can function) as an efficient collision energy absorbing member. As a result, it is possible to even further enhance the vehicle occupant protecting function when collision energy has acted on the vehicle body 11.

Further, because each of the load transmitting connection mechanisms 110 comprises a combination of the fitting recessed portion 111 and the fitting projecting portion 112 and because the fitting projecting portion 112 is caused to fit into the fitting recessed portion 111 once the collision detecting sensor 61 detects a collision of the vehicle, the second embodiment can even further simplify the construction of the load transmitting connection mechanisms 110. Further, by the fitting projecting portion 112 fitting into the fitting recessed portion 111, the sub frame 30 can be connected to the vehicle body frame 10 even more firmly and reliably at the time of a collision of the vehicle.

In the aforementioned manner, the collision-responsive frame locking device 100 can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame 20 and sub frame 30.

Note that, in the second embodiment, the drive source 122 may be implemented by other than an electric actuator, such as an inflator, in which case the output rod 122*a* is expanded upwardly by the inflator.

Further, in the second embodiment, whether the fitting recessed portion 111 and the fitting projecting portion 112 should be provided in the vehicle body frame 20 or in the sub frame 30 may be set as desired or as necessary; the same can be said of the connection drive section 120. Whether the fitting recessed portion 111 and the fitting projecting portion 112 and connection drive section 120 should be provided in the vehicle body frame 20 or in the sub frame 30 may be set, for example, in accordance with the type of the vehicle and in such a manner that the sub frame 30 can be connected to the vehicle body frame 20 with an utmost reliability or in such a manner that manufacture and assembly of the collision-responsive frame locking device 100 etc. can be facilitated.

Further, in the second embodiment, the combination of the rod lifting portion 124 and the flange portion 121a can function also as the load transmitting connection mechanism 110; namely, the lifting recessed portion 124a can function also as the fitting recessed portion 111 while the flange portion 121a can function also as the fitting projecting portion 112; the elastic bush 50 is located between one pair of the rod lifting portion 124 and flange portion 121a and another pair of the rod lifting portion 124 and flange portion 121a (adjacent to the fitting recessed portion 111 and fitting projecting portion 112) as viewed in plan. In such a case, the fitting recessed portion 111 and the fitting projecting portion 112 may be dispensed with so that the collision-responsive frame locking device 100 can be even further simplified in construction.

However, in the case where the fitting recessed portion 111 and the fitting projecting portion 112 are provided without being dispensed with, they can function as guide members for appropriately positioning the sub frame 30 as the sub frame 30 is lifted relative to the vehicle body frame 20. In order for the fitting recessed portion 111 and the fitting projecting portion 112 to function as guide members for appropriately positioning the sub frame 30 like this, the inner cylinder 52 and outer cylinder 53 of the elastic bush 50 shown in FIG. 3 may be modified as necessary.

FIGS. 6A and 6B are views explanatory of a construction and behavior of a third embodiment of the collision-responsive frame locking device 200. FIG. 6A, which generally corresponds to FIG. 3, shows the construction of the third embodiment of the collision-responsive frame locking device 200, while FIG. 6B shows the behavior of the third embodiment of the collision-responsive frame locking device 200; note that in FIGS. 6A and 6B, the elastic bush 50 is shown in a non-sectional view.

As shown in FIG. 6A, the third embodiment of the collision-responsive frame locking device 200 includes the collision detecting sensor 61, the control section 62, a plurality of load transmitting connection mechanisms 210, and a plurality of connection drive sections 220.

Once the collision detecting sensor 61 detects a collision of the vehicle 10, i.e. once a control signal is received from the control section 62, each of the load transmitting connection mechanisms 110 is activated to connect the sub frame 30 to the vehicle body frame 20. A total of four load transmitting connection mechanisms 210 are provided, one load transmitting connection mechanisms 210 near each of the four elastic bushes 50.

Each of the load transmitting connection mechanisms 210 includes a fitting recessed portion 211 provided in one of the vehicle body frame 20 and sub frame 30 (vehicle body frame 20 in the illustrated example), and a fitting projecting portion 212 provided on the other of the vehicle body frame 20 and sub frame 30 (sub frame 30 in the illustrated example). The fitting projecting portion 212 is formed integrally with the distal end (upper end) of an elongated rod 213 extending upward from the sub frame 30 toward the vehicle body frame 20. The fitting recessed portion 212 includes a front recessed region 211a facing the front surface of the fitting projecting portion 212, and a rear recessed region 211b facing the rear surface of the fitting projecting portion 212. The front recessed region 211a, the fitting recessed portion 212 and the rear recessed region 211b are aligned with one another in the front-rear direction of the vehicle body. Predetermined gaps are provided between the front and rear recessed region 211a and 211b and the fitting recessed portion 212 in a normal state, and thus, the elastic bush 50 is not prevented from absorbing vibrations in the normal state.

A total of four connection drive sections 220 are provided, one four connection drive section 220 for each of the load transmitting connection mechanisms 210. These connection drive sections 220 drive the respective load transmitting connection mechanisms 210 independently of one another in response to a control signal given from the control section 62. Each of the connection drive sections 220 includes a drive source 221 and a slider 222.

The drive source 221 is, for example, in the form of an electric actuator having front and rear output rods 221a and 221b that, in response to a control signal from the control section 62, are expanded upward in an extremely short time. The drive source 221, which is mounted on the vehicle body frame 20, will hereinafter be sometimes referred to as "electric actuator 221". The front output rod 221a extends in the forward direction of the vehicle, while the rear output rod 221b extends in the rearward direction of the vehicle. The front recessed region 211a is provided at the rear end of the rear output rod 221b.

The slider 222 is a cylinder member elongated in the front-rear direction and mounted to the vehicle body frame 20 in such a manner that it is slidable in the front-rear direction. The slider 222 is connected at its front end 222a to the front output rod 221a, so that the slider 222 slides forward as the front output rod 221a expands forward. The rear recessed region 211b is provided in the front surface of a rear end portion 222b of the slider 222.

The third embodiment of the collision-responsive frame locking device 200 constructed in the above-described manner behaves as follows. Once the collision detecting sensor 61 detects a collision of the vehicle 10 (see FIG. 2), the electric actuator 221 of FIG. 6A, in response to an electric control signal from the control section 62, is caused to rapidly expand the front and rear output rods 221a and 221b, so that the slider 222 slides forward. Consequently, as shown in FIG. 6B, the front and rear output rods 221a and 221b rapidly fit onto the fitting recessed portion 212. In this way, each of the load transmitting connection mechanisms 210 connects the sub frame 30 to the vehicle body frame 20.

In the third embodiment, the fitting engagement between the fitting recessed portion 211 and the fitting projecting portion 212 achieves an extremely firm connection between the vehicle body frame 20 and the sub frame 30, so that a great load can be transmitted, via the fitting recessed portion 211 and the fitting projecting portion 212, in the front-rear direction between the vehicle body frame 20 and the sub frame 30. Namely, each of the load transmitting connection mechanisms 210 can achieve a great load transmission characteristic. Thus, the load transmission characteristic provided between the vehicle body frame 20 and the sub frame 30 by the load transmitting connection mechanisms 210 is greater than that provided by the elastic bushes 50. In this way, the sub frame 30 can be firmly connected to the vehicle body frame 20, and thus, collision energy can be efficiently absorbed by the sub frame 30. Namely, when collision energy has been applied to the vehicle body 11, the sub frame 30 can be used (i.e., can function) as an efficient collision energy absorbing member. As a result, it is possible to even further enhance the vehicle occupant protecting function when collision energy has acted on the vehicle body 11.

Further, because each of the load transmitting connection mechanisms 210 comprises a combination of the fitting recessed portion 211 and the fitting projecting portion 212 and because the fitting projecting portion 212 is caused to fit into the fitting recessed portion 211 once the collision detecting sensor 61 detects a collision of the vehicle, the third embodiment can even further simplify the construction of the load transmitting connection mechanisms 210. Further, by the fitting projecting portion 212 fitting into the fitting recessed portion 211, the sub frame 30 can be connected to the vehicle body frame 10 even more firmly and reliably at the time of a collision of the vehicle.

In the aforementioned manner, the collision-responsive frame locking device 200 can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame 20 and sub frame 30.

Note that, in the third embodiment, the drive source 221 may be implemented by other than an electric actuator, such as an inflator, in which case the output rods 221a and 221b are expanded by the inflator in the front-rear direction of the vehicle body.

Further, in the third embodiment, whether the fitting recessed portion 211 and the fitting projecting portion 212 should be provided in the vehicle body frame 20 or in the sub frame 30 may be set as desired or as necessary; the same can be said of the connection drive section 220. Whether the fitting recessed portion 211 and the fitting projecting portion 212 and connection drive section 220 should be provided in the vehicle body frame 20 or in the sub frame 30 may be set, for example, in accordance with the type of the vehicle and in such a manner that the sub frame 30 can be connected to the vehicle body frame 20 with an utmost reliability or in such a manner that manufacture and assembly of the collision-responsive frame locking device 200 etc. can be facilitated.

Figure 7A:
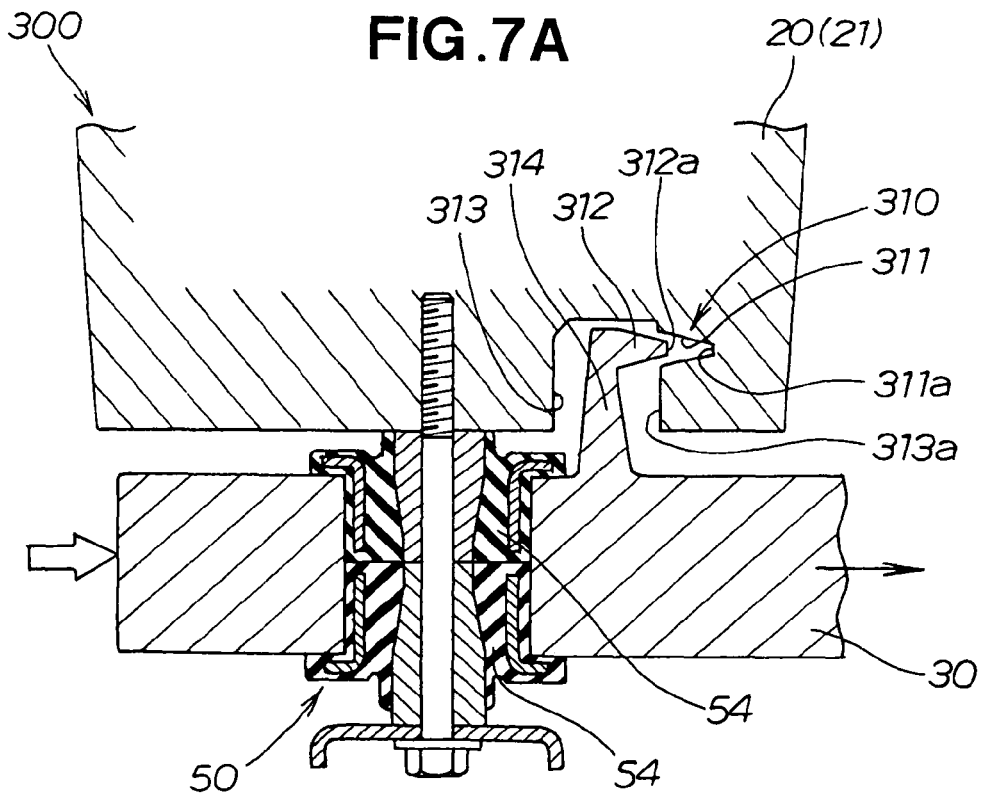
FIGS. 7A and 7B are views explanatory of a construction and behavior of a fourth embodiment of the collision-responsive frame locking device.
Figure 7B:
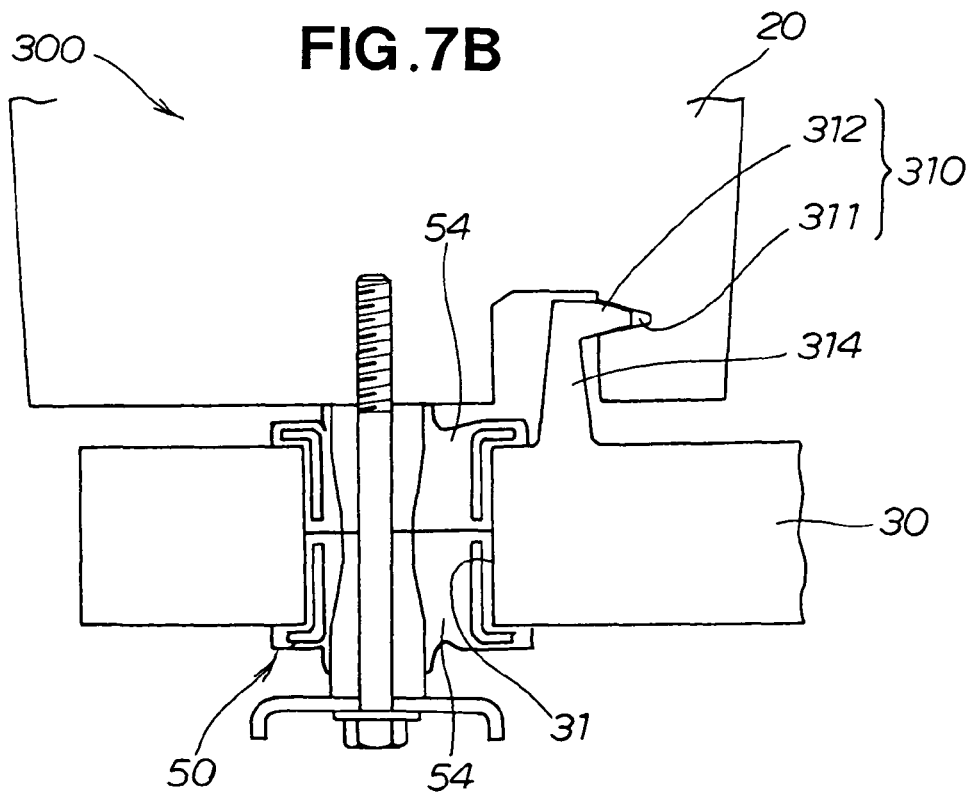

FIGS. 7A and 7B are views explanatory of a construction and behavior of a fourth embodiment of the collision-responsive frame locking device 300, which includes a plurality of load transmitting connection mechanisms 310 capable of connecting the sub frame 30 to the vehicle body frame 20 upon detection of a collision of the vehicle 10. A total of four load transmitting connection mechanisms 310 are provided, one load transmitting connection mechanisms 310 near each of the four elastic bushes 50.

Each of the load transmitting connection mechanisms 310 includes a fitting recessed portion 311 provided in one of the vehicle body frame 20 and sub frame 30 (vehicle body frame 20 in the illustrated example), and a fitting projecting portion 312 provided on the other of the vehicle body frame 20 and sub frame 30 (sub frame 30 in the illustrated example).

The vehicle body frame 20 has an inserting recessed portion 313 opening downwardly toward the sub frame 30, and the above-mentioned fitting recessed portion 311 is formed in a rear wall portion 313a of the inserting recessed portion 313. The fitting recessed portion 311 is formed as a "female-tapering" recess that opens forward and tapers toward the rear of the vehicle, and it has a bottom 311a at its rear end.

In the sub frame 30, the fitting projecting portion 312 is formed at the distal end (upper end) of an elongated rod 314 that extends upwardly from the upper surface of the sub frame 30 into the inserting recessed portion 313 of the vehicle body frame 20. The fitting projecting portion 312 projects rearwardly from the distal end of the elongated rod 314. The fitting projecting portion 312 is formed as a "male-tapering" projection that tapers toward the rear of the vehicle and has a distal end 312a opposed to the bottom 311a of the fitting recessed portion 311.

The fitting recessed portion 311 and the fitting projecting portion 312 are aligned with each other in the front-rear direction of the vehicle body. In a normal state, a predetermined gap is provided between the fitting recessed portion 311 and the fitting projecting portion 312; particularly, there is provided a predetermined gap in the front-rear direction of the vehicle body between the bottom 311a of the fitting recessed portion 311 and the distal end 312a of the fitting projecting portion 312. Thus, the elastic bush 50 is not prevented from absorbing vibrations in a normal state.

The fourth embodiment of the collision-responsive frame locking device 300 behaves as follows. When the vehicle 10 has collided with an external object or obstacle ahead and collision energy has acted on the sub frame 30 of FIG. 7A from the front of the vehicle at an initial stage of the collision, the sub frame 30 is displaced rearwardly relative to the vehicle body frame 20, so that the male-tapering fitting projecting portion 312 fits into the female-tapering fitting recessed portion 311. In this way, each of the load transmitting connection mechanisms 310 connects the sub frame 30 to the vehicle body frame 20.

In the fourth embodiment, the fitting engagement between the fitting recessed portion 311 and the fitting projecting portion 312 achieves an extremely firm connection between the vehicle body frame 20 and the sub frame 30, so that a great load can be transmitted, via the fitting recessed portion 311 and the fitting projecting portion 312, in the front-rear direction between the vehicle body frame 20 and the sub frame 30. Namely, each of the load transmitting connection mechanisms 310 can achieve a great load transmission characteristic. Thus, the load transmission characteristic provided between the vehicle body frame 20 and the sub frame 30 by the load transmitting connection mechanisms 310 is greater than that provided by the elastic bushes 50. In this way, the sub frame 30 can be firmly connected to the vehicle body frame 20, and thus, collision energy can be efficiently absorbed by the sub frame 30. Namely, when collision energy has been applied to the vehicle body 11, the sub frame 30 can be used (i.e., can function) as an efficient collision energy absorbing member. As a result, it is possible to even further enhance the vehicle occupant protecting function when collision energy has acted on the vehicle body 11.

Further, because each of the load transmitting connection mechanisms 310 comprises a combination of the fitting recessed portion 311 and the fitting projecting portion 312 and because the fitting projecting portion 312 is caused to fit into the fitting recessed portion 311 once the collision detecting sensor 61 detects a collision of the vehicle, the fourth embodiment of the collision-responsive frame locking device 300 performs a so-called passive action where the fitting projecting portion 312 fits into the fitting recessed portion 311. Therefore, the fourth embodiment can dispense with an active drive source, such as an electric actuator or inflator, a collision detecting sensor and a control section. Thus, the overall construction of the collision-responsive frame locking device 300 can be even further simplified. Further, by the fitting projecting portion 312 fitting into the fitting recessed portion 311, the sub frame 30 can be connected to the vehicle body frame 10 even more firmly and reliably at the time of a collision of the vehicle.

In the aforementioned manner, the collision-responsive frame locking device 300 can operate to satisfy, at the time of a collision of the vehicle, both (1) the requirement of restraining vibrations and sound noise from being transmitted to the interior of the vehicle compartment to thereby achieve an enhanced riding comfort and amenity of vehicle occupants and (2) the requirement of efficiently absorbing collision energy by means of the vehicle body frame 20 and sub frame 30.

Figure 8:
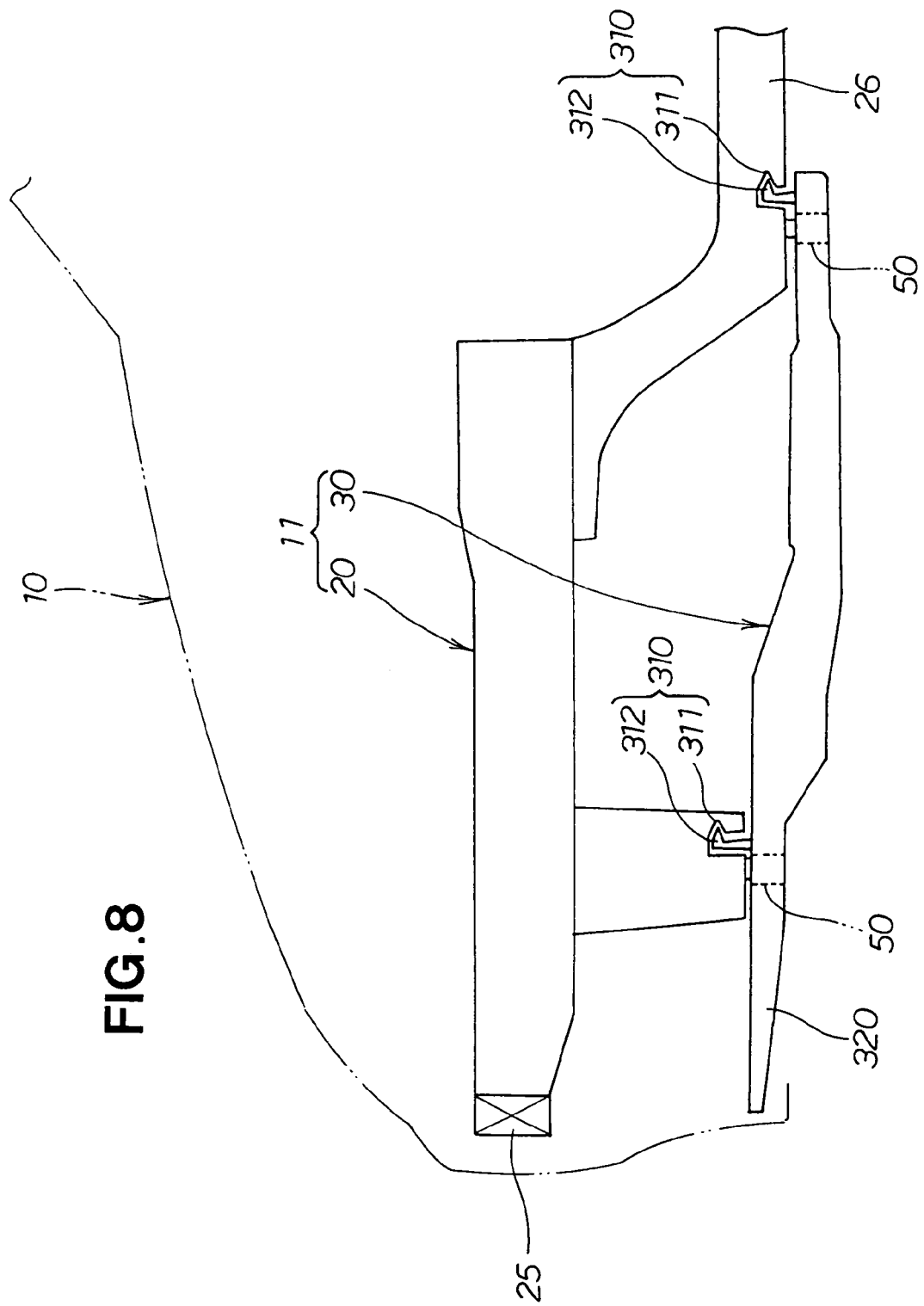
FIG. 8 is a view showing a modification of the front section of the vehicle shown in FIG. 2.

FIG. 8 is a view showing a modification of the front section of the vehicle shown in FIG. 2, which is characterized in that a frame extension portion 320 extends forward from the front end of the sub frame 30 so that the front end of the frame extension portion 320 is located near and immediately below the bumper 25. In this case, the load transmitting connection mechanisms 310 shown in FIG. 7 are provided on the vehicle body 11.

When the vehicle 10 has collided with an external object or obstacle ahead, such a modification allows collision energy to be transmitted immediately to the sub frame 30 by way of the frame extension portion 320. Thus, at an initial stage of the collision, the fitting projecting portion 312 immediately fits into the fitting recessed portion 311, so that the vehicle body frame 20 and the sub frame 30 can cooperate with each other to absorb the collision energy with an even further enhanced efficiency.

Note that, in the vehicle body 11, the sub frame 30 may be mounted to a rear section, rather than the front section, of the vehicle body frame 20. Further, the sub frame 30 may have at least one of the power source 41 and suspensions 43 supported thereon. Furthermore, the power source 41 may be other than the engine, such as an electric motor, as long as it generates power for running the vehicle.

Furthermore, the collision-responsive frame locking devices 60, 100 and 200 are not limited to the aforementioned construction that is provided with the control section 62; for example, they may be constructed in such a manner that a collision detection signal of the collision detecting sensor 61 is supplied directly to the connection drive sections 64 and drive sources 122, 221.

Furthermore, the collision detecting sensor 61 is not limited to the one comprising the acceleration sensor and may be another type of sensor or system capable of identifying a collision of the vehicle 10. Namely, the collision detecting sensor 61 may be other than the acceleration sensor as long as it is a sensor or system comprising, for example, a displacement sensor or limit switch for measuring deformation of the vehicle body 11 produced by a collision and capable of identifying a collision of the vehicle 10.

The vehicle body structure of the present invention is well suited for application to automobiles where a sub frame having a power source and suspensions supported thereon is mounted to a vehicle body frame via elastic members.

What is claimed is:

1. A vehicle body structure comprising:
a vehicle body frame;
a sub frame mounted to the vehicle body frame via an elastic member and having at least one of a suspension and a power source supported thereon;
a collision detecting sensor; and
a load transmitting connection mechanism for connecting the sub frame to the vehicle body frame once the collision detecting sensor detects a collision of the vehicle body structure,
wherein a first load transmission characteristic provided between the vehicle body frame and the sub frame by the load transmitting connection mechanism is greater than a second load transmission characteristic provided by the elastic member.

2. The vehicle body structure of claim 1, wherein the load transmitting connection mechanism has a hole provided in one of the vehicle body frame and the sub frame and a pin provided on another of the vehicle body frame and the sub frame, and the pin is caused to fit into the hole once the collision detecting sensor detects the collision of the vehicle body structure.

3. The vehicle body structure of claim 1, wherein the load transmitting connection mechanism has a fitting recessed portion provided in one of the vehicle body frame and the sub frame and a fitting projecting portion provided on another of the vehicle body frame and the sub frame, and the fitting projecting portion is caused to fit into the fitting recessed portion once the collision detecting sensor detects the collision of the vehicle body structure.

4. The vehicle body structure of claim 1, wherein the collision detecting sensor comprises an acceleration sensor.

* * * * *